No. 788,864. PATENTED MAY 2, 1905.
S. J. WEBB.
METHOD OF COMPRESSING COTTON.
APPLICATION FILED SEPT. 29, 1900.
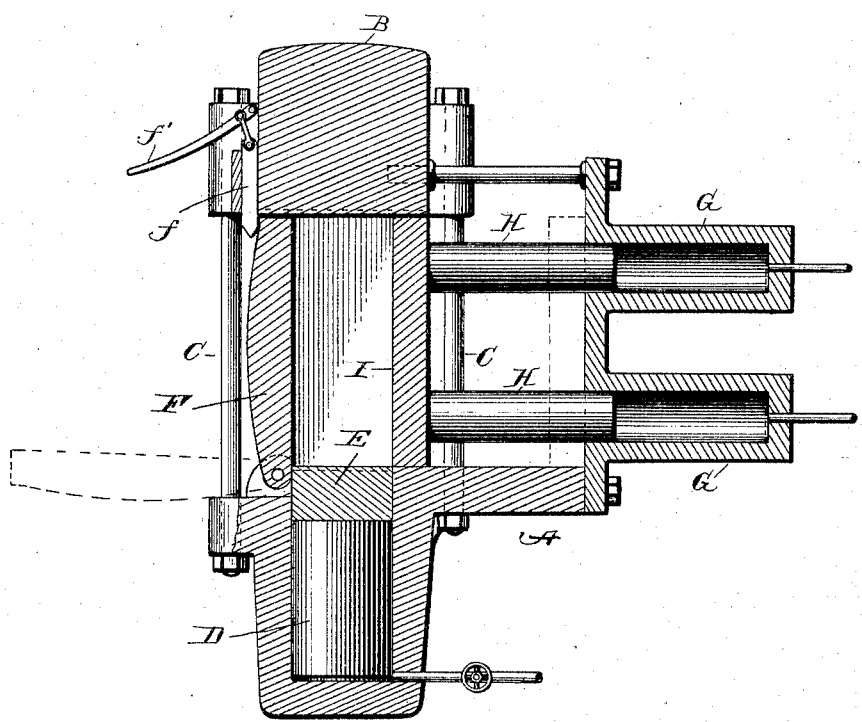
Witnesses
J. M. Fowler Jr.
E. Harrener
Inventor
Samuel J. Webb
By Foster Freeman Attorneys No. 788,864. Patented May 2, 1905.

UNITED STATES PATENT OFFICE.

SAMUEL J. WEBB, OF MINDEN, LOUISIANA.

METHOD OF COMPRESSING COTTON.

SPECIFICATION forming part of Letters Patent No. 788,864, dated May 2, 1905.

Application filed September 29, 1900. Serial No. 31,564.

*To all whom it may concern:*

Be it known that I, SAMUEL J. WEBB, a citizen of the United States, residing at Minden, in the parish of Webster and State of Louisiana, have invented certain new and useful Improvements in Methods of Compressing Cotton, of which the following is a specification.

My invention relates to a new and improved method of compressing cotton and similar material with a view of increasing its density and decreasing its size; and to this end it consists in the mode of operation substantially as hereinafter more particularly set forth.
Generally stated, my improved method consists in first compressing a bale in the direction of the last pressure it has received, whether it be a plantation bale or a compressed bale, and this direction is generally through what is ordinarily known as the "top" and "bottom" of the bale, and then compress the bale endwise, or in the direction of its greatest length, and then while under pressure securing the bale against expansion in the direction of its original length, as by bands passed around the ends and sides of the bale in contradistinction to around the original sides and top and bottom of the bale, as is usual. If, for instance, I utilize my improved method in connection with a plantation bale, which ordinarily has the dimensions of twenty-eight inches wide, forty inches thick, and fifty-eight inches long, and subject this to compression in the direction of the top and bottom, it is well known that in order to compress such a bale so as to reduce its thickness from forty inches to, say, eighteen inches it requires a relatively very small compressing power, while to reduce its thickness from forty inches to eight inches requires a relatively very great power and necessitates the use of a powerful and expensive compress. If, however, the thickness of the bale has been reduced to eighteen inches, its end presents a surface of twenty-eight times eighteen inches—say of five hundred and four square inches—and thus its ends present a relatively smaller area of surface to which the pressure is applied. It is well known that with a compress exerting a given total power the pressure exerted on the thing being compressed is in direct ratio to the area of the surface to which the pressure is applied. If now the plantation bale having been compressed in the direction of its last pressure and reduced to a thickness of, say, eighteen inches is then subjected to compression in a longitudinal direction endwise, it can be further compressed and condensed by a press of relatively small power. If now the bale as thus compressed is secured by banding it in the direction of its last compression—that is, by passing bands longitudinally around the bale over its ends in contradistinction to the usual way, where the bands are passed over the sides and top and bottom of the bale—the result is that the bale is condensed to a high density by the use of a compress of relatively small total pressing power. So, too, if instead of the country or plantation bale a compressed bale is operated upon—the dimensions of which may be given, for example, say twenty-eight inches wide and eighteen to twenty inches thick and fifty-eight long— and this bale is subjected to compression in the direction of the last pressure, which is usually in the direction of the pressure of the plantation press, it can readily be brought to a thickness of about ten or twelve inches by a relatively small compressing power. I may add here that the reason of this is that after the bale has been compressed once—as, for instance, when it is subjected to high pressure and brought to a thickness of eight or ten inches and then banded—and it expands to, say, about eighteen inches it can be compressed a second time to the same thickness, ten inches, with much less power than was applied to it to attain the first compression. If now this compressed bale has been first compressed in the direction of its last compression and brought to a thickness of about twelve inches, the area of its ends will be about three hundred and thirty-six square inches, and if this bale is now subjected to compression it can be reduced in size and condensed with the expenditure of a relatively small total pressure, and if when thus compressed and condensed it is confined against expansion in the direction of the last pressure by passing the bands around the bale in this direction the result will be a bale of relatively greater density compressed on a press of relatively small total pressing power. Such a compressed bale, whether thicker or thinner, may also be simply confined in the direction of its last pressure and then compressed endwise and banded, as above described.

Of course the dimensions above given are explanatory only, and my invention is not limited to compressing bales, either plantation or compressed bales of any particular size, nor to a compress of any particular total pressing power, as the principles of my invention are the same regardless of the precise dimensions of the bale and the power of the press.

In order to show one means whereby my improved method may be utilized, reference is made to the accompanying drawing, wherein the figure shows a sectional view of a compress which may be used in carrying out my invention.

In the drawing, A represents the base of the machine, and B the stationary platen, connected to the base in any suitable way, as by rods C C. Mounted in the base A is a hydraulic cylinder D, carrying the movable platen E. Also hinged to the base A is a confining-plate F, which may be located in position by any suitable means, as a bolt $f$, operated by the handle $f'$.

Attached to the base A and to the stationary platen B is a hydraulic cylinder G, in this instance being shown in the form of a double cylinder, in which move the hydraulic pistons H H, connected to the platen I. Suitable means for applying power to these hydraulic pistons of course are provided; but they need not be specifically shown or described here, as this compress is only shown illustratively of one means of carrying out the method, and it is understood that it may be operated by other than hydraulic power.

With such a construction as that illustrated, the confining-plate F being swung down, the bale is introduced so that it is placed on end between the stationary platen B and movable platen E and its top or bottom are in the plane of the platen I and confining-plate F when the latter is closed. The confining-plate being raised by an engine or any suitable means and located in its closed position, (shown in the drawing,) power is applied to the hydraulic pistons H, and the bale is compressed between the confining-plate F and the platen I in the direction of the last compression upon the bale, whether a plantation bale or a previously-compressed bale. It is understood that the drawing shows the parts in position after the bale has received this first compression of the press. Power is then applied to the hydraulic piston D, and the platen E is moved toward the stationary platen B, compressing the bale endwise. When it is sufficiently compressed, the confining-plate F and platen I are retracted to the position indicated in dotted lines and the bale secured by passing the bands around the bale in the direction of its length or last compression while it is yet confined under pressure between platens E and B. No special means are shown here for moving the confining-plates or retracting the platen I, as any ordinary well-known means may be employed. It will thus be seen that the bale is first compressed in a direction of its last pressure, whether it be a plantation or compressed bale, unless the bale is thin enough without this compression, is then confined or held under such pressure, is then compressed endwise and secured against expansion in this direction while still under the final pressure, and is then removed from the press. It will further be seen that by passing the bands around the bale in the direction of its last compression it will not only be confined against expansion in the direction of the last compression, but also in the direction of the previous compression, so that the bands confine the bale against expansion in either or both of the directions of compression.

What I claim is—

1. The method substantially as hereinbefore set forth of compressing bales, which consists in pressing the bale in the direction of the last pressure which it has received, confining it against expansion in this direction, compressing it endwise, and finally securing the bale in such compressed form against expansion in the direction of both pressures.

2. The method substantially as hereinbefore set forth of compressing bales, which consists in pressing a bale in the direction of its last pressure, confining it against expansion in this direction by maintaining said pressure, compressing it endwise, and securing it against expansion in the direction of this final pressure.

3. The method substantially as hereinbefore set forth of compressing bales, which consists in pressing a bale in the direction of its top and bottom, maintaining said pressure, compressing it endwise, and securing it in said compressed form against expansion in the direction of both pressures.

4. The method substantially as hereinbefore set forth of compressing bales, which consists in confining a bale against expansion in the direction of its last pressure, compressing it endwise transversely to the direction of the last pressure, freeing it from said first confinement, and securing it in its final compressed form while under the latter pressure.

5. The method substantially as hereinbefore set forth of compressing bales, which consists in pressing a bale in the direction of its last pressure, confining it in this direction, compressing it on its smallest area, and securing it in said compressed form against expansion in the direction of both pressures.

6. The method substantially as hereinbefore set forth of compressing bales, which consists in confining a bale against expansion in the direction of its last pressure, compressing it on its smallest area, and securing it in such compressed form against expansion in the direction of the last pressure.

In testimony whereof I have signed my name to this specification in the presence of two subscribing witnesses.

SAMUEL J. WEBB.

Witnesses:
G. P. Kramer,
F. L. Freeman.